Patented Dec. 31, 1940

2,227,061

UNITED STATES PATENT OFFICE 2,227,061

METHOD FOR THE PREPARATION OF TERPENE ESTERS

Joseph N. Borglin, Wilmington, Del., assignor to Hercules Powder Company, Wilmington, Del., a corporation of Delaware No Drawing. Application December 27, 1939, Serial No. 311,173

15 Claims. (Cl. 260—454)

This invention relates to a method for the preparation of thiocyanoacyl, selenocyanoacyl, and tellurocyanoacyl esters of terpene compounds.

In the application of J. U. Borglin, Serial No. 198,687, filed March 29, 1938, there is disclosed a new series of terpene compounds having the type formula ROOCR'XCN in which R is a radical of a terpene compound, in which R' is an aromatic or aliphatic radical, and in which X is sulfur, selenium, or tellurium. There is also disclosed a method of preparing these compounds by the reaction of a terpene compound first with a halogenated organic acid and then with a metal thiocyanate, selenocyanate, or tellurocyanate.

It is an object of this invention to provide a method of preparing the terpene esters in a single step whereby the number of operations in which rearrangement of the terpenes and decomposition of the esters may occur is reduced.

According to the method of this invention, an unsaturated terpene compound or a saturated terpene alcohol is reacted with a thiocyano organic carboxylic acid to form the compound having the type formula ROOCR'XCN hereinabove mentioned.

The terpene compound which I employ may be an unsaturated terpene hydrocarbon such as, for example, pinene, terpinene, terpinolene, camphene, dipentene, allo-ocimene, menthene, limonene, sylvestrene, phellandrene, etc. Again it may be a saturated or unsaturated terpene alcohol. It may be a secondary terpene alcohol such as, for example, borneol, isoborneol, fenchyl alcohol, etc.; a tertiary terpene alcohol such as terpineol, hydroterpineol, etc.; a polyhydric terpene alcohol such as terpin, sobrerol, etc.; a condensation product of an unsaturated terpene with formaldehyde, etc.; or it may be a terpene ether such as terpinyl methyl ether, terpinyl ethyl ether, terpinyl butyl ether, ethylene glycol ether of pinene, diethylene glycol ether of pinene, glycerol ether of pinene, etc. Commercial terpene cuts such as wood or gum turpentine, pine oil, etc. may be used.

The thiocyano, selenocyano, or tellurocyano organic carboxylic acid which I may utilize may be derived from such organic acids as acetic, propionic, butyric, valeric, caproic, capric, maleic, lauric, myristic, palmitic, oleic, ricinoleic, stearic, crotonic, naphthenic, malonic, glycollic, tartaric, benzoic, phthallic, etc. mixtures of the acids may also be used, if desired. The thiocyano, selenocyano, and tellurocyano substituted acids may also be used in their anhydride or their acyl halide forms when reacting upon terpene alcohols and inner ethers and also when reacting upon unsaturated terpene compounds in the presence of water.

The thiocyano substituted carboxylic acids may be prepared, for example, by reacting a salt such as the sodium salt of the corresponding halogen substituted acid with a metal thiocyanate, a metal selenocyanate, or a metal tellurocyanate, as the case may be, which is reactive therewith. Metal thiocyanates such as sodium thiocyanate, potassium thiocyanate, lithium thiocyanate, calcium thiocyanate, ammonium thiocyanate, etc. and corresponding selenocyanates and tellurocyanates are suitable. The resulting sodium or other salt is then converted to the thiocyano, selenocyano, or tellurocyano substituted acid by treatment with dilute sulphuric acid, phosphoric acid, hydrochloric acid, etc.

In carrying out the method according to this invention, the terpene compound utilized is agitated with the acylating agent at any temperature within the range between about 0° C. and about 200° C. preferably at a temperature between about 100° C. and about 160° C. Preferably, an excess of acylating agent is utilized. If desired, the reaction may be conducted in an inert atmosphere, such as an atmosphere of nitrogen or carbon dioxide, whereby a product of lighter color is obtained.

After the reaction has been carried out, excess acid material is preferably removed by thorough washing with water. Conveniently, a water immiscible solvent such as, for example, petroleum ether, ethyl ether, benzene, toluene, carbon tetrachloride, a terpene hydrocarbon, etc., is added to aid in the washing operation. After the reaction product has been washed free of excess acid, volatile solvents such as petroleum ether, etc., may be removed if desired.

The method in accordance with this invention will be further illustrated by the examples which follow. All parts and percentages are by weight unless otherwise specified.

Example 1

A mixture of 10.4 parts of alpha-pinene and 10 parts of alpha-thiocyanopropionic acid was heated for 23 hours at a bath temperature of 120–130° C. The reaction mixture was then extracted with about 100 parts of petroleum ether. The extract obtained, containing the product, was washed with two 11 part portions of formamide and then washed repeatedly with water. Upon removal of the petroleum ether by evaporation at reduced pressure, a yield of 8 parts of product analyzing 6.4% sulfur and representing the alpha-thiocyanopropionate of the pinene was obtained.

Example 2

A mixture of 10.4 parts of camphene and 10 parts of alpha-thiocyanopropionic acid was heated under reflux for 23 hours at a bath temperature of 120–130° C. The reaction mixture was then extracted with 100 parts of petroleum ether. The extract obtained, containing the product, was washed with three 11 part portions of formamide and then washed repeatedly with water. The petroleum ether was then removed by heating under reduced pressure. A yield of 9 parts of product analyzing 4.2% sulfur and representing the isobornyl alpha-thiocyanopropionate derived from the camphene was obtained.

Example 3

A mixture of 11.8 parts of fenchyl alcohol and 10 parts of alpha-thiocyanopropionic acid was heated under reflux for 23 hours at a bath temperature of 120–130° C. The reaction mixture was then extracted with about 120 parts of petroleum ether. The extract obtained was washed with three 11 part portions of formamide and then washed repeatedly with water. The petroleum ether was then removed by evaporating under reduced pressure. A yield of product analyzing 3.7% sulfur and representing the fenchyl alphathiocyanoproprionate was obtained.

Example 4

A mixture of 13.5 parts of borneol and 10 parts of alphathiocyano-n-butyric acid was heated under reflux for 23 hours at a bath temperature of 120–130° C. About 8 parts of toluene was added to the reaction mixture after the first 2 hours of heating to prevent the collection of borneol on the cooler portions of the flask utilized and in the condenser. At the end of the reaction period, the toluene was removed by evaporation under reduced pressure. The reaction mixture was then extracted with about 100 parts of petroleum ether. The ether extract obtained was washed with three 11 part portions of formamide and then washed repeatedly with water. The petroleum ether was removed by evaporation at reduced pressure. A yield of 11 parts of product analyzing 8% sulfur was obtained. This product consisted chiefly of a mixture of unreacted borneol and bornyl alpha-thiocyano-n-butyrate.

Example 5

A mixture of 12.5 parts of borneol and 9.5 parts of thiocyanoacetic acid was heated for 32 hours at a temperature increasing from 120–125° C. during the heating period. About 8 parts of toluene and about 12 parts of xylene were added during the reaction to prevent condensation of borneol in the condenser. The reaction mixture was extracted with about 140 parts of petroleum ether used in three portions. The extract obtained was then washed with two portions of about 11 parts of formamide and then several times with water. The volatile solvents present were then removed from the extract by evaporation under reduced pressure. A yield of 7.5 parts of product analyzing 1.4% sulfur and representing the bornyl thiocyanoacetate was obtained.

Example 6

A mixture of 18 parts of camphene and 20 parts of thiocyanoacetic acid was heated under reflux for a total of 47 hours in an oil bath, the temperature of which was maintained for 8 hours at 120° C., for 7 hours at 145–155° C., and for 32 hours at 160–170° C. About 12 parts of xylene was added to the reaction mixture to prevent condensation of camphene in the condenser. The reaction product mixture was then extracted with 140 parts of petroleum ether. The extract obtained was washed with two portions of about 11 parts each of formamide and then washed repeatedly with water. Volatile solvents were then removed by evaporation at reduced pressure. A yield of 6 parts of product analyzing 1% sulfur and representing the isobornyl thiocyanoacetate derived from the camphene was obtained.

In the foregoing examples, the product obtained consisted of the thiocyano acid ester diluted with the unreacted terpene compound started with, residual volatile solvent, and also to some extent with unreactive terpenes present in the raw material and possibly with some terpene hydrocarbons formed by decomposition of the ester desired. The thiocyanoacyl ester may be separated if desired from the diluents by distilling off the latter under a vacuum, or with the aid of steam, or both. However, for most purposes there is no advantage in making this separation as the product is conveniently used in the solution formed.

The compounds prepared in accordance with this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

Where the term "pinene" is used herein, it will be understood to include both the alpha and beta forms. Similarly "terpin" includes both the 1:4 and 1:8 forms; also, "terpineol" and "hydroterpineol" include the alpha, beta, and gamma forms.

It will be understood that the details and examples as hereinbefore set forth are illustrative only, and that the invention as broadly described and claimed is in no way limited thereby.

What I claim and desire to protect by Letters Patent is:

1. A method for the preparation of terpene compounds having the type formula

ROOCR'XCN in which R is a radical of a terpene compound, in which R' is a radical selected from the group consisting of aromatic or aliphatic radicals, and in which X is an element selected from the group consisting of sulfur, selenium, and tellurium, which comprises reacting a terpene compound selected from the group consisting of unsaturated terpene compounds and saturated terpene alcohols with a suitable aliphatic acylating agent selected from the group consisting of thiocyano carboxylic acids, thiocyano carboxylic acid anhydrides, thiocyanoacyl halides and their selenocyano and tellurocyano counterparts.

2. A method for the preparation of terpene compounds having the type formula

ROOCR'XCN in which R is a radical of a terpene compound, in which R' is a radical selected from the group consisting of aromatic or aliphatic radicals, and in which X is an element selected from the group consisting of sulfur, selenium, and tellurium, which comprises reacting a terpene compound selected from the group consisting of unsaturated terpene compounds and saturated terpene alcohols with an organic carboxylic acid having a substituent radical selected from the group consisting of thiocyano, selenocyano, and tellurocyano radicals.

3. A method for the preparation of terpene compounds having the type formula

ROOCR'XCN in which R is a radical of a terpene compound, in which R' is an aliphatic radical, and in which X is an element selected from the group consisting of sulfur, selenium, and tellurium, which comprises reacting a terpene compound selected from the group consisting of unsaturated terpene compounds and saturated terpene alcohols with an aliphatic carboxylic acid having a substituent radical selected from the group consisting of thiocyano, selenocyano, and tellurocyano radicals.

4. A method for the preparation of terpene compound having the type formula

ROOCR'XCN in which R is a radical of a terpene compound, in which R' is a lower aliphatic radical, and in which X is an element selected from the group consisting of sulfur, selenium, and tellurium, which comprises reacting a terpene compound selected from the group consisting of unsaturated terpene compounds and saturated terpene alcohols with a lower fatty acid having a substituent radical selected from the group consisting of thiocyano, selenocyano, and tellurocyano radicals.

5. A method for the preparation of terpene compounds having the type formula

ROOCR'SCN in which R is a radical of a terpene compound and in which R' is an aliphatic radical, which comprises reacting an unsaturated terpene hydrocarbon with a thiocyano substituted aliphatic carboxylic acid.

6. A method for the preparation of terpene compounds having the type formula

ROOCR'SCN in which R is a radical of a terpene compound and in which R' is an aliphatic radical, which comprises reacting pinene with a thiocyano substituted aliphatic carboxylic acid.

7. A method for the preparation of terpene compounds having the type formula

ROOCR'SCN in which R is a radical of a terpene compound and in which R' is an aliphatic radical, which comprises reacting an unsaturated terpene alcohol with a thiocyano substituted aliphatic carboxylic acid.

8. A method for the preparation of terpene compounds having the type formula

ROOCR'SCN in which R is a radical of a terpene compound and in which R' is an aliphatic radical, which comprises reacting a saturated terpene alcohol with a thiocyano substituted aliphatic carboxylic acid.

9. A method for the preparation of terpene compounds having the type formula

ROOCR'XCN in which R is a radical of a terpene compound, in which R' is a lower aliphatic radical, and in which X is an element selected from the group consisting of sulfur, selenium, and tellurium, which comprises reacting a terpene secondary alcohol with a lower fatty acid having a substituent radical selected from the group consisting of thiocyano, selenocyano, and tellurocyano radicals.

10. A method for the preparation of terpene compounds having the type formula

ROOCR'SCN in which R is a radical of a terpene compound and in which R' is a lower aliphatic radical, which comprises reacting a terpene secondary alcohol with a thiocyano substituted lower fatty acid.

11. A method for the preparation of terpene compounds having the type formula

ROOCR'SCN in which R is a radical of a terpene compound and in which R' is a lower aliphatic radical, which comprises reacting a bornyl alcohol with a thiocyano substituted lower fatty acid.

12. A method for the preparation of terpene compounds having the type formula

ROOCR'SCN in which R is a radical of a terpene compound and in which R' is a lower aliphatic radical, which comprises reacting a fenchyl alcohol with a thiocyano substituted lower fatty acid.

13. A method for the preparation of terpene compounds having the type formula

ROOCR'SCN in which R is a radical of a terpene compound and in which R' is a lower aliphatic radical, which comprises reacting a terpene secondary alcohol with thiocyanoacetic acid.

14. A method for the preparation of terpene compounds having the type formula

ROOCR'SCN in which R is a radical of a terpene compound and in which R' is a lower aliphatic radical, which comprises reacting a terpene secondary alcohol with a thiocyanopropionic acid.

15. A method for the preparation of terpene compounds having the type formula

ROOCR'SCN in which R is a radical of a terpene compound and in which R' is a lower aliphatic radical, which comprises reacting a terpene secondary alcohol with a thiocyanobutyric acid.

JOSEPH N. BORGLIN.